Patented Feb. 18, 1941

2,232,433

UNITED STATES PATENT OFFICE 2,232,433

METHOD OF PREPARING TERPIN ESTERS

Joseph N. Borglin, Wilmington, Del., assignor to Hercules Powder Company, Wilmington, Del., a corporation of Delaware No Drawing. Application April 14, 1939, Serial No. 267,912

5 Claims. (Cl. 260—489)

This invention relates to an improved method for the preparation of a terpin ester of a lower fatty acid and more particularly to an improved method for the preparation of a terpin ester of a lower fatty acid by the reaction of terpin with an anhydride of a lower fatty acid.

By the method in accordance with this invention, terpin is reacted with an anhydride of a lower fatty acid at a temperature within the range of about 60° C. to about 125° C., and preferably within the range of about 95° C. to about 125° C. By the use of a temperature of reaction within the range of about 60° C. to about 125° C., an efficient reaction is obtained and, at the same time, the loss of terpin by dehydration is avoided.

The terpin utilized in this reaction can be conveniently obtained by the partial dehydration of terpin hydrate. Thus, for example, terpin may be obtained by heating terpin hydrate to a temperature of about 113° C. until the evolution of water ceases.

The anhydride of a lower fatty acid which I utilize in the method in accordance with this invention may be, for example, acetic anhydride, propionic anhydride, butyric anhydride, etc.

In carrying out the method in accordance with this invention, a mixture of terpin and the lower fatty acid anhydride is heated, preferably under reflux, to a temperature within the range of about 60° C. to about 125° C. for a period of about 16 hours to about 120 hours. In carrying out this reaction stoichiometric proportions of the two reactants may be used, but, in general, I prefer to use an excess of the anhydride of the lower fatty acid. The terpin ester produced by this method may be recovered from the reaction mixture by distilling the more volatile anhydride and acid which remain at the end of the reaction, to leave the terpin ester as a residue. Alternately, it may be recovered by washing the reaction mixture with water, a mild alkali, and then with water, and finally separated from the water with which it is immiscible.

The method in accordance with this invention is further illustrated by the following examples:

Example 1

Three hundred parts by weight of terpin and 450 parts by weight of acetic anhydride were heated at about 90° C., on a steam bath for a period of 40 hours. The resulting product was then divided into two equal portions which were treated as follows:

One-half (374 parts by weight) of the product was distilled under a vacuum of about 25 cm. and at an oil bath temperature of about 150° C. to remove the excess acetic anhydride and acetic acid. The residue remaining after this distillation was terpin diacetate and was recovered in a 65% by weight (145 parts by weight) yield. This product had the following properties:

Saponification number_____ 328
Refractive index_____ 1.4578

The other half of the product was washed with water, with an aqueous solution of sodium carbonate and finally with water. As a result of this treatment, a yield of 73.5% by weight of terpin diacetate (164 parts by weight) was recovered.

Example 2

Three hundred parts by weight of terpin and 450 parts by weight of butyric anhydride were heated for forty hours at 90–95° C., for sixteen hours at 110° C., and finally for eight hours at 125° C. The reaction product was cooled to room temperature and washed with sodium carbonate solution, the aqueous wash solution being discarded. The resulting water insoluble product was washed thoroughly with water, filtered, and then dried by heating at 100° C. under reduced pressure.

By this procedure, 278 parts by weight of terpin dibutyrate were obtained. The terpin dibutyrate had the following properties:

Refractive index at 20° C_____ 1.465
Specific gravity at 15.6° C./15.6° C_____ 0.9551

It will be appreciated that the method in accordance with this invention may be utilized to prepare chemically mixed lower fatty acid terpin esters such as terpin acetate-butyrate, terpin acetate-propionate, terpin butyrate-propionate, etc. Instead of a single fatty acid anhydride, two fatty acid anhydrides may be used in equimolecular proportions, or, if desired, an additional slight excess of the anhydride having the higher molecular weight may be used. Chemically mixed fatty acid anhydrides may also be used in an equivalent manner.

The terpin esters produced in accordance with this invention are valuable insecticides. They are also solvents for nitrocellulose and cellulose acetate, and therefore valuable in the formulation of cellulose ester compositions in which relatively high boiling solvents are desired.

It will be understood that the details and examples given herein are by way of illustration and not by way of limitation of my invention as herein broadly described and claimed.

What I claim and desire to protect by Letters Patent is:

1. A method for the preparation of a terpin lower fatty acid ester which comprises reacting terpin with a lower fatty acid anhydride at a temperature within the range of about 60° C. to about 125° C. and then separating the terpin ester from the reaction mixture.

2. A method for the preparation of a terpin lower fatty acid ester which comprises reacting terpin with a lower fatty acid anhydride at a temperature within the range of about 95° C. to about 125° C.

3. A method for the preparation of terpin diacetate which comprises reacting terpin with acetic anhydride at a temperature within the range of about 95° C. to about 125° C.

4. A method for the preparation of terpin dipropionate which comprises reacting terpin with propionic anhydride at a temperature within the range of about 95° C. to about 125° C.

5. A method for the preparation of terpin dibutyrate which comprises reacting terpin with butyric anhydride at a temperature within the range of about 95° C. to about 125° C.

JOSEPH N. BORGLIN.